United States Patent
Miyagi

(10) Patent No.: US 6,920,321 B1
(45) Date of Patent: Jul. 19, 2005

(54) MEASURING METHOD FOR COMMUNICATION DEVICE

(75) Inventor: Hiroshi Miyagi, Tokyo (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 0 days.

(21) Appl. No.: 09/530,369

(22) PCT Filed: Aug. 31, 1999

(86) PCT No.: PCT/JP99/04698

§ 371 (c)(1),
(2), (4) Date: Sep. 5, 2000

(87) PCT Pub. No.: WO00/14912

PCT Pub. Date: Mar. 16, 2000

(30) Foreign Application Priority Data

Sep. 4, 1998 (JP) .......................... 10-267306

(51) Int. Cl.[7] ............................................... H04Q 7/20
(52) U.S. Cl. .................... 455/423; 455/67.11; 455/424; 455/425
(58) Field of Search ................................ 455/423, 424, 455/425, 67.11, 67.1

(56) References Cited

U.S. PATENT DOCUMENTS

| | | | | |
|---|---|---|---|---|
| 5,361,402 A | * | 11/1994 | Grube et al. ............... | 455/67.1 |
| 5,386,589 A | * | 1/1995 | Kanai ......................... | 455/423 |
| 5,930,707 A | * | 7/1999 | Vambaris et al. ........... | 455/424 |
| 5,978,659 A | * | 11/1999 | Kim ........................... | 455/67.1 |
| 5,983,185 A | * | 11/1999 | Cuffaro et al. .............. | 704/270 |
| 6,011,962 A | * | 1/2000 | Lindenmeier et al. ..... | 455/226.1 |
| 6,073,034 A | * | 6/2000 | Jacobsen et al. ............ | 455/566 |
| 6,088,588 A | * | 7/2000 | Osborne ..................... | 455/425 |
| 6,219,544 B1 | * | 4/2001 | Suutarinen .................. | 455/423 |
| 6,266,527 B1 | * | 7/2001 | Mintz ......................... | 455/423 |
| 6,480,718 B1 | * | 11/2002 | Tse ............................ | 455/446 |

FOREIGN PATENT DOCUMENTS

JP 7-131429 7/1995

* cited by examiner

Primary Examiner—William Trost
Assistant Examiner—Stephen D'Agosta
(74) Attorney, Agent, or Firm—Dellett & Walters

(57) ABSTRACT

The object is to provide a measurement system of communication device that makes it possible to reduce costs and spaces for measurement. A CPU 13 gives a signal generator 4 an instruction to output a signal for measurement. A signal generator 4 outputs the signal for measurement into which a predetermined audio signal is modulated, in accordance with the instruction. A reception processing section 11 performs predetermined reception processing including demodulation processing for the signal for measurement, and outputs the demodulated signal. A low frequency analyzer 6 measures characteristics of the demodulated signal outputted from the reception processing section 11, and outputs the result of measurement to the CPU 13. The CPU 13 displays the result of measurement on an LCD 12, and adjusts the characteristics of the reception processing section 11.

12 Claims, 5 Drawing Sheets

MEASURING METHOD FOR COMMUNICATION DEVICE

BACKGROUND OF THE INVENTION

1. Technical Field

The present invention relates to a measurement system of communication device for carrying out various kinds of measurements relating to communication devices.

2. Background Art

In radio broadcasting, the signal into which a sound signal is modulated by using modulation methods such as AM modulation and FM modulation is sent from a broadcasting station. Hence, a radio receiver outputs an original sound signal by demodulating the signal that it has received in accordance with the modulation method. However, since elements such as transistors and inductors configuring a tuner in the radio receiver varies in characteristics even though they have same element constants, using same elements to configure the tuner does not necessarily result in unified characteristics of tuners as a whole. Hence, there has been a case that a sound signal after being demodulated is deformed, and that output level thereof decreases.

Then, in the production process of radio receiver sin general, deformation and output level of the sound signal demodulated by the radio receiver are measured, and the element constant is adjusted based on the result of measurement.

FIG. 7 is a diagram of a conventional measuring system that measures characteristics of a radio receiver A measuring system 500 shown in this figure measures deformation and output level of a signal demodulated by a radio receiver 502, and is configured by including a signal generator 504, a low frequency analyzer 506, a personal computer 508 and a display unit 510.

In the case where deformation and output level of the signal demodulated by the radio receiver 502 are measured by using the measuring system 500, measurement condition data such as carrier wave frequency and modulation methods are transmitted from the personal computer 508 to the radio receiver 502 and the signal generator 504. The signal generator 504 outputs the signal for measurement into which a predetermined audio signal is modulated, in accordance with measurement condition data outputted from the personal computer 508. The radio receiver 502, on the other hand, demodulates the signal for measurement outputted from the signal generator 504 in accordance with the measurement condition data outputted from the personal computer 508, and outputs the signal obtained by the demodulation to the low frequency analyzer 506. The low frequency analyzer 506 measures deformation and output level of this demodulated signal, and then outputs the result of measurement to the personal computer 508. The personal computer 508 displays the result of measurement outputted from the low frequency analyzer 506 on the display unit 510 to notify the measurement operator thereof.

However, the above described conventional measuring system 500 must comprise the personal computer 508 and the display unit 510, thus making the configuration thereof more complicated, increasing costs and making it necessary to secure an installation space. Furthermore, the personal computer 508 must be connected to each radio receiver 502, causing work-hours in the production process including adjustment and inspection to be increased.

Also, in a mobile telecommunication device such as cellular phone, whether demodulation processing and modulation processing are properly done is measured, and various kinds of adjustments are performed based on the result of measurement. FIG. 8 is a diagram of a conventional measuring system that measures the characteristics of a mobile telephone. As shown in this figure, a measuring system 550 measures deformation and output level of the signal demodulated or modulated by a mobile telephone 552, and is configured to include a signal generator 554, a low frequency analyzer 556, an audio frequency signal generator (AF generator) 558, a transmission analyzer 560, a personal computer 562 and a display unit 564.

In the case where deformation and output level of the signal demodulated by the mobile telephone 552 are measured by using this measuring system 550, operation is performed as in the case with the measuring system 500 shown in FIG. 7.

Furthermore, in the case where deformation and output level of the signal modulated by the mobile telephone 552 are measured by using this measuring system 550, the personal computer 562 gives an instruction to output an audio signal for measurement towards the AF generator 558, and measurement condition data such as carrier wave frequency and modulation methods are transmitted towards the mobile telephone 552. The mobile telephone 552 modulates the audio signal for measurement outputted from the AF generator 558, and then outputs the modulated signal to the transmission analyzer 560. The transmission analyzer 560 measures deformation and output level of this modulated signal, and outputs the result of measurement to the personal computer 562. The personal computer 562 displays the result of measurement outputted from the transmission analyzer 560 on the display unit 564 to notify the measurement operator thereof.

However, similarly as the case with the measuring system 500 shown in FIG. 7, since it is necessary to provide the personal computer 562 and the display unit 564, there rises the disadvantage of a higher cost and a difficulty in securing an installation space, and causes labor in the production process to be increased.

DISCLOSURE OF THE INVENTION

The present invention has been achieved by taking this point into account, and the purpose thereof is to provide a measurement system of communication devices, which enables the reduction of costs and spaces for measurement.

In the measurement system of communication device according to the present invention, a communication device comprising a processing device performs demodulation processing for a predetermined signal for measurement generated and outputted by the signal generator and outputs the demodulated signal, a measuring device measures characteristics of this demodulated signal and transmits the result of measurement to the processing device, and the processing device included in the communication device controls a series of measurement procedures and reports the result of measurement. In this way, since the processing device included in the communication device controls the measurement operation, it is not necessary to comprise another processing device for controlling the measurement operation (for example, personal computer) as in the prior art. It is therefore possible to simplify the configuration of an entire measuring system and reduce the cost. Furthermore, since it is not necessary to secure a space for installation of another processing device, the space for measurement can be reduced. Moreover, work to connect another processing device to the communication device is not involved in the production process, thus making it possible to reduce man-hours in the production process.

In particular, the communication device comprises the display unit, and the processing device provides a predetermined display on the display unit and reports the result of measurement, thereby allowing the measurement operator to confirm the result of measurement without connecting any display unit and so forth elsewhere.

Furthermore, the above described processing device preferably performs control operation corresponding to at least a part of receiving operation during normal operation of the communication device. In this case, since the processing device originally included in the communication device can be used, it is not necessary to comprise another processing device for controlling measurement operation, thus making it possible to further reduce the cost.

Moreover, the above described processing device preferably includes a reception processing section that receives a carrier wave having a predetermined receiving frequency and demodulates and takes out the signal included in this carrier wave, and performs various kinds of settings relating to the reception processing section. The processing device performs settings such as receiving frequencies and modulation methods of the communication device, thereby making it possible to implement a series of measurement controls for properly receiving various kinds of measurement signals to perform predetermined demodulation processing, and measuring the characteristics of the demodulated signal by the measuring device.

In the measurement system of communication device according to the present invention, a communication device comprising a processing device performs modulation processing for a predetermined signal for measurement generated and outputted by the signal generator and outputs the modulated signal, a measuring device measures characteristics of this modulated signal and transmits the result of measurement to the processing device, and the processing device included in the communication device controls a series of measurement procedures and reports the result of measurement. In this way, since the processing device included in the communication device controls the measurement operation similarly as the measurement system of communication device performing predetermined receiving operation, it is not necessary to comprise another processing device for controlling the measurement operation as in the prior art. It is therefore possible to simplify the configuration of an entire measuring system and reduce the cost. Moreover, since it is not necessary to provide a space for installation of another processing device, the space for measurement can be reduced. Furthermore, work to connect another processing device to the communication device is not required in the production process, thus making it possible to reduce labor-hours in the production process.

In particular, the communication device comprises the display unit, and the processing device provides a predetermined display on this display unit and reports the result of measurement, thereby allowing the measurement operator to confirm the result of measurement without connecting any display unit, etc. elsewhere.

Furthermore, the above described processing device preferably performs control operation corresponding to at least a part of transmission operation during normal operation of the communication device. In this case, since the processing device originally comprised in the communication device can be used, it is not necessary to comprise another processing device for controlling measurement operation, thus making it possible to further reduce the cost.

Moreover, the above described communication device preferably includes a transmission processing section that transmits a carrier wave having a predetermined frequency by performing modulation processing wherein the processing device performs various kinds of settings relating to the transmission processing section. It is possible to implement a series of measurement controlling operation of performing predetermined modulation processing for various kinds of signals for measurement inputted and measuring characteristics of these modulated signals by the measuring device.

BEST MODE FOR CARRYING OUT THE INVENTION

Figure 1:
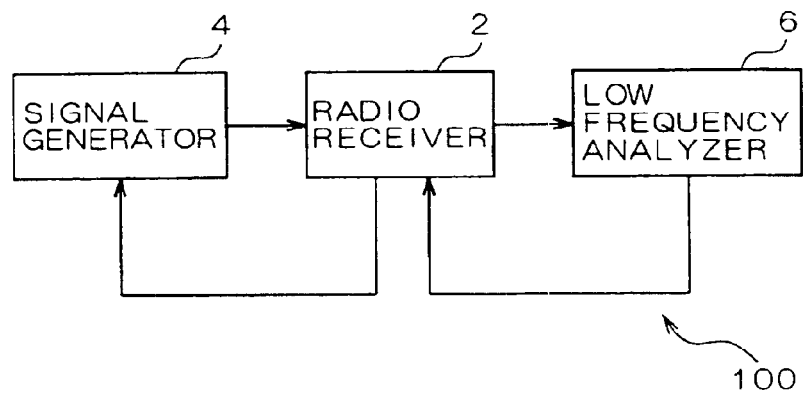
FIG. 1 is a diagram of an overall configuration of a measuring system of a first embodiment.

A measuring system of a communication device of one embodiment, to which the present invention is applied, is characterized in that a processing device provided in the communication device performs control when the characteristics of a signal demodulated or modulated by the communication device are measured by the communication device. In the following, the measuring system of one embodiment will be described referring to the drawings.

(First Embodiment)

FIG. 1 is a diagram of an overall configuration of a measuring system of a first embodiment. A measuring system 100 shown in this figure measures the characteristics of a signal demodulated by a radio receiver 2, and is configured by including a signal generator 4 that outputs the signal for measurement into which a predetermined audio signal is modulated, and a low frequency analyzer 6 as a measuring device that measures the characteristics of the signal demodulated by the radio receiver 2.

The radio receiver 2 sends measurement condition data required for performing measurement relating to its own transmission function to the signal generator 4, and gives the signal generator 4 an instruction to generate and output a predetermined signal for measurement in accordance with the content of the measurement condition data. The measurement condition data include information, for example carrier wave frequencies, modulation methods (such as AM modulation and FM modulation) and degree of modulation. The radio receiver 2 then receives the signal for measurement outputted from the signal generator 4, performs predetermined demodulation processing for this received signal for measurement, and outputs this demodulated signal to the low frequency analyzer 6.

Furthermore, when the result of measurement for the above described demodulated signal is inputted from the low frequency analyzer 6, the radio receiver 2 displays the result of this measurement on a built-in liquid crystal display (LCD), and adjusts the characteristics of the built-in reception processing section. The configuration of the radio receiver 2 will be described later.

The signal generator 4 generates a signal for measurement by modulating a predetermined audio signal in accordance with the carrier wave frequency, the modulation system or the like included in the measurement condition data inputted from the radio receiver 2, and outputs this signal for measurement to the radio receiver 2.

When an audible band low frequency signal which is the demodulated signal is inputted from the radio receiver 2, the low frequency analyzer 6 measures the characteristics such as output level and waveform deformation of this demodulated signal and outputs the result of measurement towards the radio receiver 2.

Figure 2:
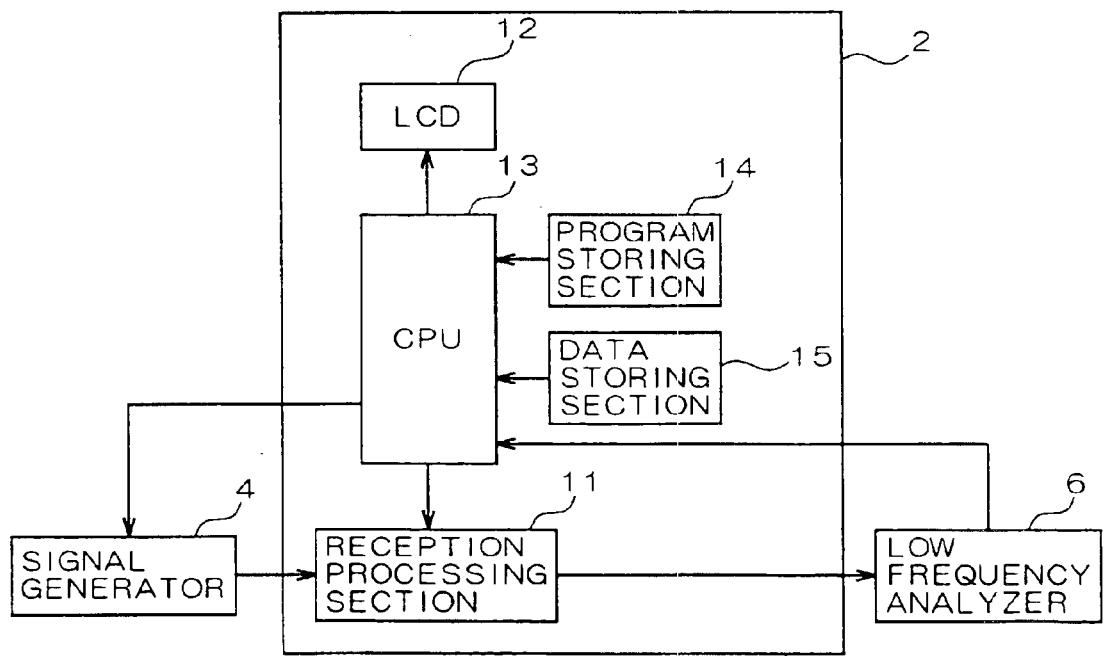
FIG. 2 is a diagram of a configuration of a radio receiver

FIG. 2 is a diagram of a configuration of the radio receiver 2. As shown in this figure, the radio receiver 2 is configured to include a reception processing section 11, a LCD 12, a CPU 13, a program storing section 14 and a data storing section 15.

The reception processing section 11, which has for example a circuit configuration of super-heterodyne mode, performs high frequency amplification processing, frequency conversion processing, intermediate frequency amplification processing, detection processing and so forth for the signal for measurement outputted from the signal generator 4, and outputs the demodulated signal. This reception processing section 11 is configured to include for example a variable capacity capacitor for adjusting characteristics. By changing the capacity of this variable capacity capacitor, for example, the amplification degree in the high frequency amplification processing is changed, and the characteristics of the reception processing section 11 are adjusted.

The LCD 12 displays the frequency of the broadcasting being received and the current time during normal receiving operation, but in the case where the characteristics of the demodulated signal are measured, it displays the result of measurement outputted from the low frequency analyzer 6 and informs the measurement operator of the content thereof.

The CPU 13 controls the entire radio receiver 2. For example, the CPU 13 defines the receiving frequency of the reception processing section 11 and the demodulation method in accordance with selection of broadcasting directed by the user and performs control so that selected broadcasting can be received, regulates sound volume of a speaker (not shown) in accordance with regulation of sound volume directed by the user.

Furthermore, the CPU 13 outputs measurement condition data to the signal generator 4 and gives the signal generator 4 an instruction to output a signal for measurement in accordance with the content of the measurement condition data in the case where the characteristics of the demodulated signal are measured. Furthermore, the CPU 13 defines the receiving frequency and the demodulation method of the reception processing section 11 in accordance with the carrier wave frequency and the modulation method included in measurement condition data so that the reception processing section 11 can perform reception processing for the signal for measurement. Furthermore, when the result of measurement for the demodulated signal is inputted from the low frequency analyzer 6, the CPU 13 displays this result of measurement on the LCD 12 and adjusts the characteristics of the reception processing section 11 based on this result of measurement.

The program storing section 14 stores programs for performing various kinds of processing by the CPU 13. For example, it stores a program for receiving to receive a predetermined broadcast wave using the radio receiver 2 and a program for measurement to perform predetermined measurement operation. The program storing section 14 stores measurement condition data and the like. The above described radio receiver 2 is corresponding to the communication device as a subject of measurement, the low frequency analyzer 6 to the measuring device, the LCD 12 to the display unit, and the CPU 13 to the processing device, respectively.

Figure 3:
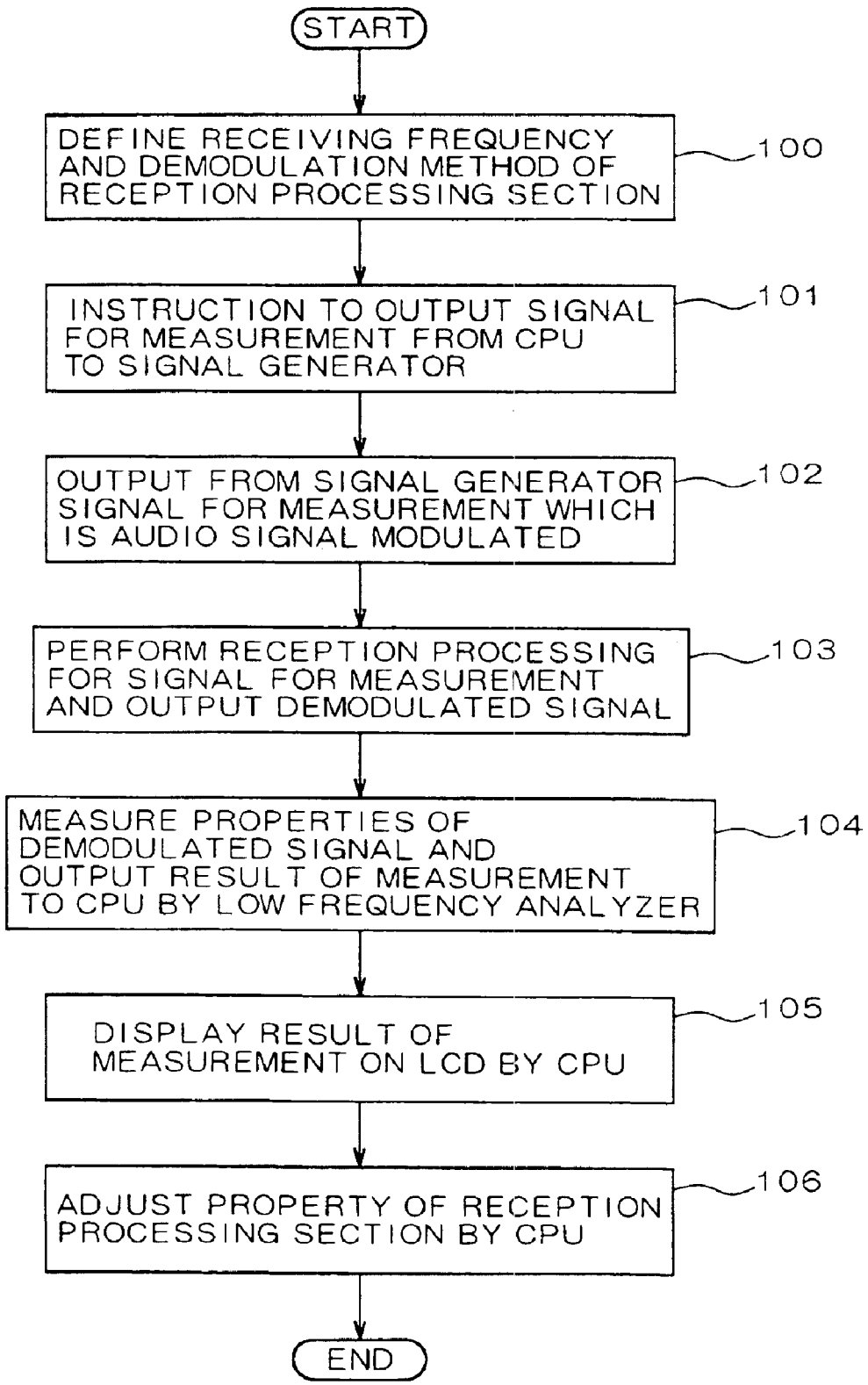
FIG. 3 is a flow chart of a measurement procedure in the measuring system shown in the FIG. 1.

The measuring system 100 of the embodiment is configured in this way, and then the operation thereof will be described. FIG. 3 is a flow chart of measurement procedure in the measuring system 100 shown in FIG. 1.

The CPU 13 defines the receiving frequency and the demodulation method of the reception processing section 11 in accordance with the carrier wave frequency and the modulation method included in measurement condition data so that the reception processing section 11 can perform reception processing for the signal for measurement (Step 100).

The CPU 13 then transmits measurement condition data to the signal generator 4 and gives the signal generator 4 an instruction to output a signal for measurement in accordance with the content of the measurement condition data (Step 101). The signal generator 4 outputs the signal for measurement into which a predetermined audio signal is modulated to the reception processing section 11 in accordance with the instruction (Step 102).

The reception processing section 11 then performs predetermined reception processing including demodulation processing for the signal for measurement outputted from the signal analyzer 4, and outputs the demodulated signal to the low frequency analyzer 6 (Step 103). The low frequency analyzer 6 measures the characteristics such as output level and deformation of waveform of the demodulated signal outputted from the reception processing section 11, and outputs the result of measurement to the CPU 13 (Step 104).

When the result of measurement is sent from the low frequency analyzer 6, the CPU 13 displays this result of measurement on the LCD 12 (Step 105). The CPU 13 then adjusts the characteristics of the reception processing section 11 based on this result of measurement (Step 106). Specifically, the CPU 13 judges based on the result of measurement whether or not the output level of the demodulated signal is within a predetermined range, whether or not the output waveform is deformed, and the like. In the case where the output level of the demodulated signal is out of the predetermined range or the output waveform is deformed, the CPU 13 changes the capacity of the variable capacity capacitor for adjusting characteristics included in the reception processing section 11, and adjusts the characteristics of the reception processing section 11.

Figure 7:
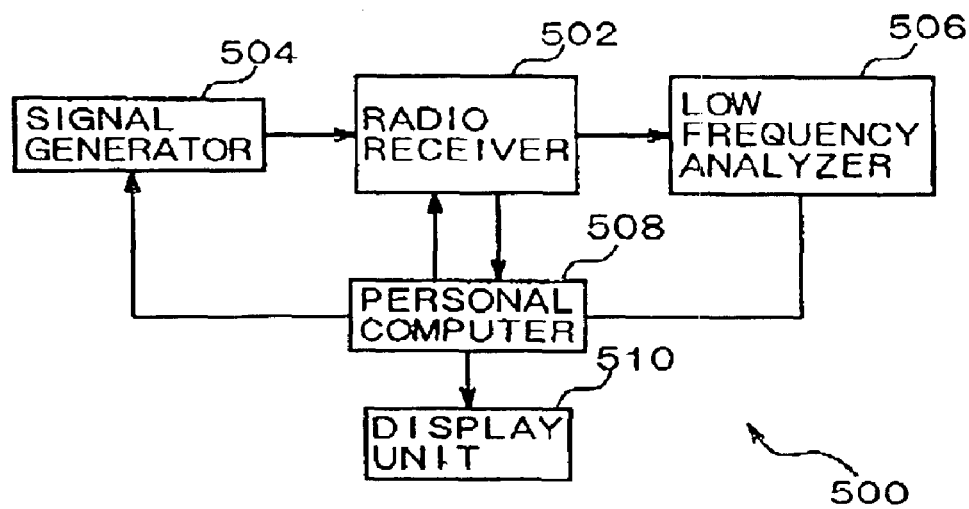
FIG. 7 is a diagram of a conventional measuring system measuring characteristics of a signal demodulated by the radio receiver.

In this way, the measuring system 100 of the embodiment, the CPU 13 comprised in the radio receiver 2 gives the signal generator 4 an instruction to output a signal for measurement and performs processing of displaying the result of measurement outputted from the low frequency analyzer 206, and the result of measurement is displayed on the LCD 12. Therefore, it is not necessary to connect the personal computer 508 and the display unit 510 for performing measurement as the conventional measuring system 500 shown in the FIG. 7 thus making it possible to reduce costs and spaces for measurement. Furthermore, since process of connecting the personal computer 508 and the display unit 510 is not involved, work-hours in the production process can also be reduced. Moreover, since the CPU 13 performs processing of adjusting the characteristics of the reception processing section 11 based on the result of measurement outputted from the low frequency analyzer 6, the characteristics of the reception processing section 11 can be adjusted without human intervention by hands.

(Second Embodiment)

Figure 4:
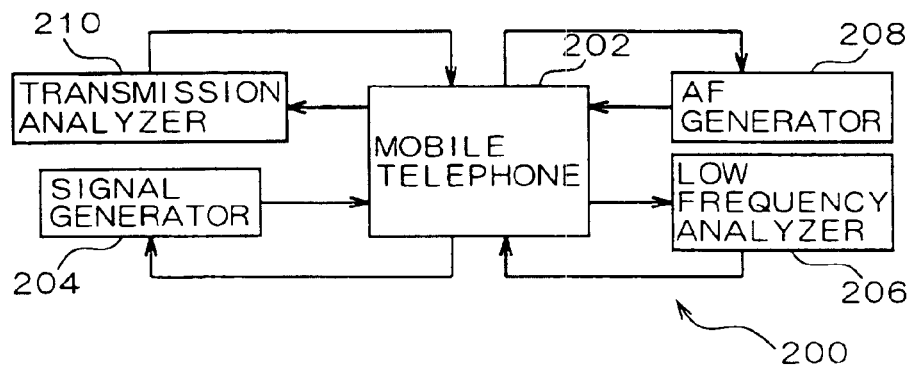
FIG. 4 is a diagram of an overall configuration of a measuring system of a second embodiment.

Then, the measuring system of the second embodiment adopting the present invention will be described. FIG. 4 is a diagram of an overall configuration of a measuring system of the second embodiment. A mobile telephone 202 in the figure outputs the voice of a partner of telephone conversation by receiving a carrier wave of predetermined frequency (for example, 800 MHz band and 1.5 GHz) transmitted from the base station to perform demodulation processing, and modulates the sound signal from the speaker collected by a built-in microphone (not shown) to transmit the carrier wave of predetermined frequency towards the base station. A measuring system 200 measures the characteristics of the signal (sound signal) demodulated by the mobile telephone 202 and the signal (carrier wave signal) modulated by the mobile telephone 202, and is configured to include a signal generator 204 that modulates a predetermined audio signal and outputs a signal for measurement corresponding to the receiving operation of the mobile telephone 202, a low frequency analyzer 206 as a measuring device that measures the characteristics of the signal demodulated by the mobile telephone 202, an audio frequency signal generator (AF generator) 208 that outputs a predetermined audio signal as a signal for measurement corresponding to the transmission operation of the mobile telephone 202, and a transmission analyzer 210 as a measuring device that measures the characteristics of the signal modulated by the mobile telephone 202.

The mobile telephone 202 performs the following operation during operation of measuring the demodulated signal or the modulated signal, in addition to the above described normal call operation. Specifically, the mobile telephone 202 sends measurement condition data required for performing measurement relating to its own receiving function to the signal generator 204, and gives the signal generator 204 an instruction to generate and output a predetermined signal for measurement in accordance with the content of the measurement condition data. The measurement condition data for example include information such as carrier wave frequencies and modulation methods of the radio wave which are transmitted from the base station and received at the mobile telephone 202. Then, the mobile telephone 202 receives the signal for measurement outputted from the signal generator 204, performs predetermined demodulation processing for the received signal for measurement, and outputs the demodulated signal to the low frequency analyzer 206.

Furthermore, the mobile telephone 202 sends measurement condition data required for performing measurement relating to its own transmission function to the AF generator 208, and gives the AF generator 208 an instruction to generate and output a predetermined signal for measurement in accordance with the content of the measurement condition data. The measurement condition data for example, include information such as the frequency and amplitude level of the audio signal as a signal for measurement inputted from the AF generator 208 to the mobile telephone 202. Then, the mobile telephone 202 performs predetermined modulation processing for the audio signal inputted from the AF generator 208 and outputs the modulated signal to the transmission analyzer 210.

Moreover, when results of measurement are inputted from the low frequency analyzer 206 and the transmission analyzer 210, the mobile telephone 202 displays these results of measurement on a built-in liquid crystal display (LCD), and adjusts the characteristics of the built-in reception processing section and transmission processing section. The configuration of the mobile telephone 202 will be described later.

The signal generator 204 generates a signal for measurement by modulating a predetermined audio signal in accordance with measurement condition data relating to the receiving function which are inputted from the mobile telephone 202, and outputs this signal for measurement to the mobile telephone 202. When an audible band low frequency signal that is the demodulated signal is inputted from the mobile telephone 202, the low frequency analyzer 206 measures the characteristics such as output level and waveform deformation of this demodulated signal and outputs the result of measurement towards the mobile telephone 202.

The AF generator 208 generates an audio signal as a signal for measurement in accordance with measurement condition data relating to the transmission function which are inputted from the mobile telephone 202, and outputs to the mobile telephone 202. When a carrier wave signal of predetermined frequency that is the modulated signal is inputted from the mobile telephone 202, the transmission analyzer 210 measures the characteristics such as output level and wave deformation of this modulated signal, and outputs the result of measurement towards the mobile telephone 202.

Figure 5:
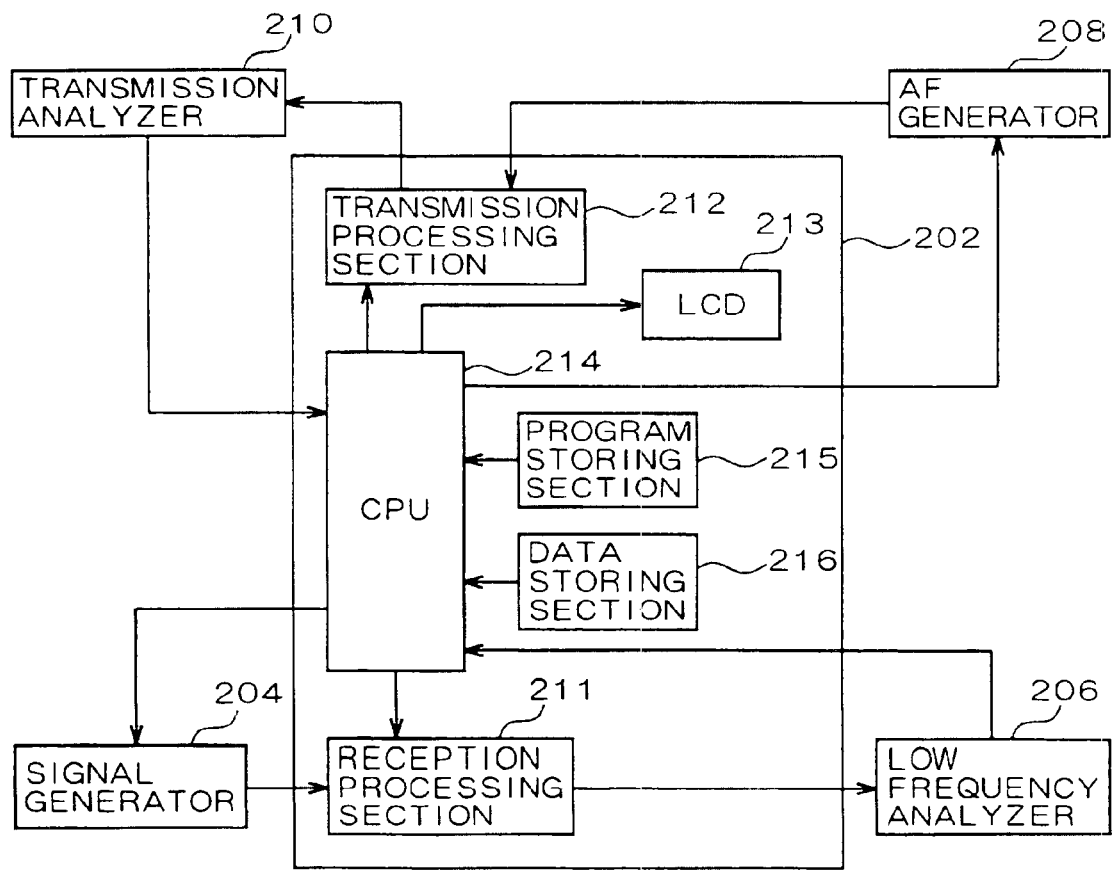
FIG. 5 is a diagram of a configuration of a mobile telephone.

FIG. 5 is a diagram of a configuration of the mobile telephone 202. As shown in this figure, the mobile telephone 202 is configured to include a reception processing section 211, a transmission processing section 212, a LCD 213, a CPU 214, a program storing section 215 and a data storing section 216.

The reception processing section 211, which has for example a circuit configuration of super-heterodyne mode, performs high frequency amplification processing, frequency conversion processing, intermediate frequency amplification processing, detection processing and so forth for the high frequency signal for measurement outputted from the signal generator 204, and outputs the demodulated signal. The transmission processing section 212 performs predetermined modulation processing such as FM modulation for the low frequency audio signal outputted from the AF generator 208, and outputs the modulated signal. The reception processing section 211 and the transmission processing section 212 are configured to include for example a variable capacity capacitor for adjustment of characteristics. The characteristics of the reception processing section 211 and the transmission processing section 212 are adjusted by changing the capacity of this variable capacity capacitor.

The LCD 213 usually displays a telephone number of the call party, etc. but in the case where the characteristics of demodulated signals and modulated signals are measured, it displays the result of measurement outputted from the low frequency analyzer 206 and the transmission analyzer 210, and notifies the measurement operator of the content thereof.

The CPU 214 controls the entire mobile telephone 202. For example, the CPU 214 performs control of the reception processing section 211 and transmission processing section 212 during telephone conversation, telephone number registry processing and so forth.

Furthermore, the CPU 214 outputs required measurement condition data to the signal generator 204 and defines a receiving frequency, a demodulation method and the like of the reception processing section 211 so that predetermined reception processing is performed by the reception processing section 211 for the signal for measurement outputted from the signal generator 204, in the case where it performs measurement relating to its own receiving function. Moreover, when the result of measurement of the demodulated signal is inputted from the low frequency analyzer 206, the CPU 214 displays this result of measurement on the LCD 213, and adjusts the characteristics of the reception processing section 211 based on this result of measurement.

Furthermore, the CPU 214 outputs required measurement condition data to the AF generator 208 and defines a transmission frequency and the like of the transmission processing section 212 so that predetermined transmission processing is performed by the transmission processing section 212 for the signal for measurement outputted from the AF generator 208, in the case where it performs measurement relating to its own transmission function. Moreover, when the result of measurement of the modulated signal is inputted from the transmission analyzer 210, the CPU 214 displays this result of measurement on the LCD 213, and adjusts the characteristics of the transmission processing section 212 based on this result of measurement.

The program storing section 215 stores a program for performing various kinds of processing by the CPU 214. For example, it stores a program for normal operation for having a conversation using the mobile telephone 202 and a program for measurement for performing predetermined measurement operation. The data storing section 216 stores various kinds of measurement condition data and the like. The above described mobile telephone 202 is corresponding to the communication device as a subject of measurement, the AF generator 208 to the signal generator, the transmission analyzer 210 to the measuring device, the LCD 213 to the display unit, and the CPU 214 to the processing device, respectively.

Figure 6:
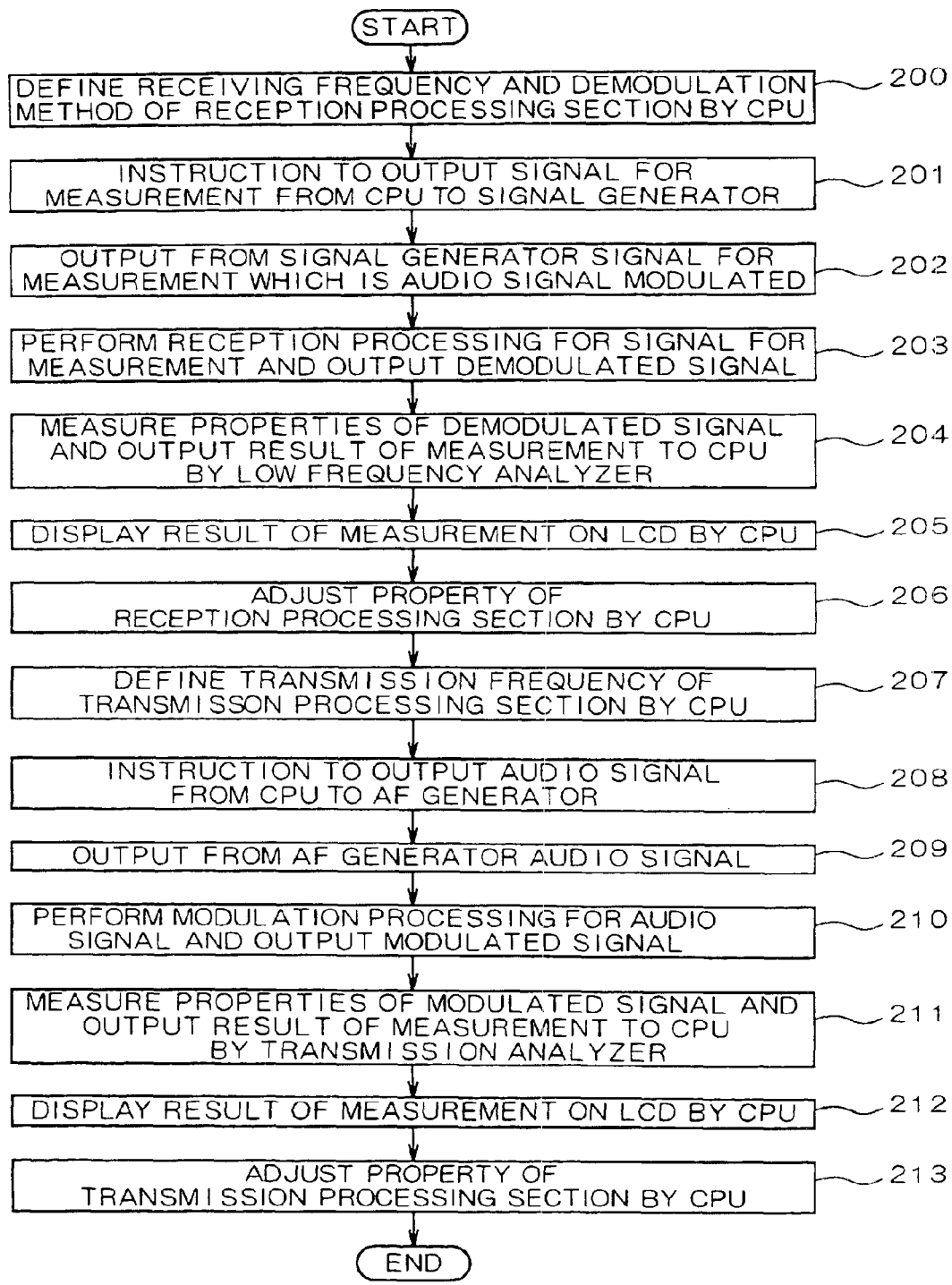
FIG. 6 is a flow chart of a measurement procedure in the measuring system shown in FIG. 4.

The measuring system 200 of communication device of the embodiment is configured in this way, and then the operation thereof will be described. FIG. 6 is a flow chart of a measurement procedure in the measuring system 200 shown in FIG. 4.

Operations of Step 200 to Step 206 are similar to those of Step 100 to Step 106 shown in FIG. 3 in the first embodiment described above. That is, in order to perform reception processing for a signal for measurement inputted from the signal generator 204, the CPU 214 defines the receiving frequency and the demodulation method of the reception processing section 211 (Step 200).

The CPU 214 transmits measurement condition data to the signal generator 204 and gives the signal generator 204 an instruction to output a signal for measurement in accordance with the content of the measurement condition data (Step 201). The signal generator 204 outputs the signal for measurement into which a predetermined audio signal is modulated to the reception processing section 211 in accordance with the instruction (Step 202).

Then, the reception processing section 211 performs predetermined reception processing including demodulation processing for the signal for measurement outputted from the signal generator 204, and outputs the demodulated signal to low frequency analyzer 206 (Step 203). The low frequency analyzer 206 measures the characteristics of the demodulated signal outputted from the reception processing section 211, and outputs the result of measurement to the CPU 214 (Step 204). When the result of measurement is sent from the low frequency analyzer 206, the CPU 214 displays this result of measurement on the LCD 213 (Step 205), and adjusts the characteristics of the reception processing section 211 based on this result of measurement (Step 206).

The CPU 214 then defines the transmission frequency of the transmission processing section 212 to perform transmission processing for the audio signal inputted from the AF generator 208 (Step 207), followed by transmitting measurement condition data to the AF generator 208 and giving the AF generator 208 an instruction to output a signal for measurement (audio signal) in accordance with the content of the measurement condition data (Step 208). The AF generator 208 outputs a predetermined audio signal to the transmission processing section 212 in accordance with the instruction (Step 209). The transmission processing section 212 performs predetermined transmission processing including modulation processing for the audio signal outputted from the AF generator 208, and outputs the modulated signal to the transmission analyzer 210 (Step 210).

The transmission analyzer 210 measures the characteristics of the modulated signal outputted from the transmission processing section 212, and outputs the result of measurement to the CPU 214 (Step 211). When the result of measurement is sent from the transmission analyzer 210, the CPU 214 displays the result of measurement on the LCD 213 (Step 212), and adjusts the characteristics of the transmission processing section 212 based on this result of measurement (Step 213).

Figure 8:
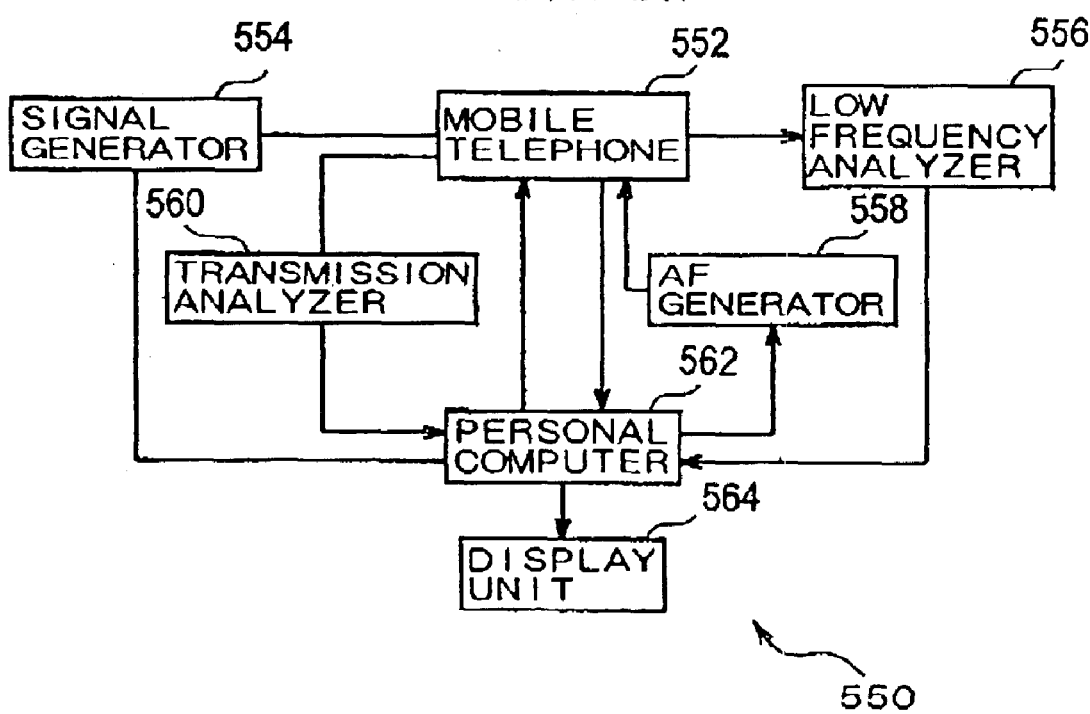
FIG. 8 is a diagram of a conventional measuring system measuring characteristics of a signal demodulated or modulated by the mobile telephone.

In this way, in the measuring system 200 of the embodiment, the CPU 214 comprised in the mobile telephone 202 gives the signal generator 204 and the AF generator 208 instructions to output the signal for measurement, and performs among other things display processing for the result of measurement outputted from the low frequency analyzer 206 or the transmission analyzer 210, and the result of measurement is displayed on the LCD 213. Therefore, it is not necessary to connect the personal computer 562 and the display unit 564 for performing measurement as the conventional measuring system of communication system 550 shown in FIG. 8, thus making it possible to reduce costs and spaces for measurement. Furthermore, since process of connecting the personal computer 562 and the display unit 564 is not required, labor in the production process can also be reduced. Moreover, since the CPU 214 performs processing of adjusting the characteristics of the reception processing section 211 based on the result of measurement outputted from the low frequency analyzer 206, and performs processing of adjusting the characteristics of the transmission processing section 212 based on the result of measurement outputted from the transmission analyzer 210, the characteristics of the reception processing section 211 and transmission processing section 212 can be adjusted without human intervention by hands.

The present invention is not limited to the above described embodiments, and a number of variations can be implemented within the spirit thereof. For example, in the above described embodiments, no limitations are made regarding storage devices used in the program storing section 14, 215 and data storing section 15, 216, but in the case where EEPROM (Electrically Erasable and Programmable ROM) is used, rewriting of programs and measurement condition data can be achieved. Thus, processing performed by the CPU 13, 214 can be easily added and altered.

Furthermore, in the above described first embodiment, the radio receiver 2 is used as a communication device, but other receivers (for example, television) may be used. Moreover, in the above described second embodiment, the mobile telephone 202 is used as a communication device, but other devices for receiving and transmitting (for example transceiver) may be used. Furthermore, the communication device having only a receiving function is described in the above described first embodiment, and the communication device having both receiving and transmission functions is described in the above described second embodiment, but the present invention may be applied for communication devices having only a transmission function.

Furthermore, in the above described embodiments, the result of measurement is displayed on the LCD 12, 213 to notify the measurement operator thereof, but notification of the result of measurement may be performed by outputting sounds from speakers, earphones and the like.

INDUSTRIAL APPLICABILITY

As described above, according to the present invention, since the processing device comprised in the communication device performs controls the measurement procedure and reports the result of measurement for the demodulated signal and the modulated signal, it is not necessary to connect another processing device for controlling the measurement as in the prior art, thus making it possible to simplify an overall configuration and reduce the cost. Moreover, since it is not necessary to secure space for installing another processing device, space for measurement can be reduced. Furthermore, since operation for connecting another processing device to the communication device is not required in the production process, work-hours in the production process can also be reduced.

What is claimed is:

1. A measurement system of communication device, comprising:
    a signal generator that generates and outputs a predetermined signal for measurement;
    a communication device including a processing device performs predetermined demodulation processing for said signal for measurement outputted from said signal generator and outputs the demodulated signal by performing predetermined receiving operation; and
    a measuring device that sends a result of measurement by measuring the characteristics of said demodulated signal outputted from said communication device to said processing device,
    wherein said processing device controls a series of measurement procedures and reports said result of measurement sent from said measuring device, and
    wherein said processing device performs control operation corresponding to at least a part of said receiving operation during normal operation of said communication device and is adapted to adjust operation of said communication device,
    wherein said communication device includes a reception processing section that receives a carrier wave having a predetermined receiving frequency, and demodulates and takes out a signal included in the carrier wave, and
    said processing device performs various kinds of setting processing required when said predetermined receiving operation is performed by said reception processing section,
    wherein said communication device includes a variable adjustment element for adjusting characteristics thereof, and wherein said processing device changes said variable adjustment element based on results of said measurement to accomplish said adjustment,
    wherein said variable adjustment element comprises a variable capacitor, and
    wherein said communication device comprises a radio receiver.

2. The measurement system of communication device according to claim 1, wherein said communication device includes a display unit, and said processing device reports said result of measurement by providing a predetermined display on said display unit.

3. The measurement system of communication device according to claim 1, wherein said processing device is configured by a CPU that controls said measurement procedures by executing a predetermined program for measurement.

4. A measurement system of communication device, comprising:
    a signal generator that generates and outputs a predetermined signal for measurement;
    a communication device including a processing device performs predetermined modulation processing for said signal for measurement outputted from said signal generator and outputs the modulated signal by performing predetermined transmission operation; and
    a measuring device that sends a result of measurement by measuring the characteristics of said modulated signal outputted from said communication device to said processing device,
    wherein said processing device controls a series of measurement procedures and reports said result of measurement sent from said measuring device, and
    wherein said processing device performs control operation corresponding to at least a part of said transmission operation during normal operation of said communication device and is adapted to adjust operation of said communication device,
    wherein said communication device includes a transmission processing section that transmits a carrier wave having a predetermined frequency by performing said predetermined modulation processing, and
    said processing device performs various kinds of setting processing required when said predetermined transmission operation is performed by said transmission processing section,
    wherein said communication device includes a variable adjustment element for adjusting characteristics thereof, and wherein said processing device changes said variable adjustment element based on results of said measurement to accomplish said adjustment,
    wherein said variable adjustment element comprises a variable capacitor, and
    wherein said communication device comprises a mobile telephone device.

5. The measurement system of communication device according to claim 4, wherein said communication device includes a display unit, and
    said processing device reports said result of measurement by providing a predetermined display on said display unit.

6. The measurement system of communication device according to claim 4, wherein said processing device is configured by a CPU that controls said measurement procedures by executing a predetermined program for measurement.

7. A measurement system of communication device, comprising:
   a signal generator that generates and outputs a predetermined signal for measurement;
   a communication device including a processing device performs predetermined demodulation processing for said signal for measurement outputted from said signal generator and outputs the demodulated signal by performing predetermined receiving operation; and
   a measuring device that sends a result of measurement by measuring the characteristics of said demodulated signal outputted from said communication device to said processing device,
   wherein said processing device controls a series of measurement procedures and reports said result of measurement sent from said measuring device, and
   wherein said processing device performs control operation corresponding to at least a part of said receiving operation during normal operation of said communication device and is adapted to adjust operation of said communication device
   wherein said communication device includes a reception processing section that receives a carrier wave having a predetermined receiving frequency, and demodulates and takes out a signal included in the carrier wave, and
   said processing device performs various kinds of setting processing required when said predetermined receiving operation is performed by said reception processing section,
   wherein said communication device includes a variable adjustment element for adjusting characteristics thereof, and wherein said processing device changes said variable adjustment element based on results of said measurement to accomplish said adjustment,
   wherein said variable adjustment element comprises a variable capacitor, and
   wherein said communication device comprises a television receiver.

8. The measurement system of communication device according to claim 7, wherein said communication device includes a display unit, and said processing device reports said result of measurement by providing a predetermined display on said display unit.

9. The measurement system of communication device according to claim 7, wherein said processing device is configured by a CPU that controls said measurement procedures by executing a predetermined program for measurement.

10. A measurement system of communication device, comprising:
    a signal generator that generates and outputs a predetermined signal for measurement;
    a communication device including a processing device performs predetermined modulation processing for said signal for measurement outputted from said signal generator and outputs the modulated signal by performing predetermined transmission operation; and
    a measuring device that sends a result of measurement by measuring the characteristics of said modulated signal outputted from said communication device to said processing device,
    wherein said processing device controls a series of measurement procedures and reports said result of measurement sent from said measuring device, and
    wherein said processing device performs control operation corresponding to at least a part of said transmission operation during normal operation of said communication device and is adapted to adjust operation of said communication device,
    wherein said communication device includes a transmission processing section that transmits a carrier wave having a predetermined frequency by performing said predetermined modulation processing, and
    said processing device performs various kinds of setting processing required when said predetermined transmission operation is performed by said transmission processing section,
    wherein said communication device includes a variable adjustment element for adjusting characteristics thereof, and wherein said processing device changes said variable adjustment element based on results of said measurement to accomplish said adjustment,
    wherein said variable adjustment element comprises a variable capacitor, and
    wherein said communication device comprises a transceiver.

11. The measurement system of communication device according to claim 10, wherein said communication device includes a display unit, and
    said processing device reports said result of measurement by providing a predetermined display on said display unit.

12. The measurement system of communication device according to claim 10, wherein said processing device is configured by a CPU that controls said measurement procedures by executing a predetermined program for measurement.

* * * * *